United States Patent Office 3,230,175
Patented Jan. 18, 1966

3,230,175
STABILIZED TRICHLOROETHYLENE AND A PROCESS FOR TREATING METALS THEREWITH
Theodore F. Martens, West Chester, Pa., assignor to E. I. du Pont de Nemours and Company, Wilmington, Del., a corporation of Delaware
No Drawing. Filed Apr. 1, 1963, Ser. No. 269,810
10 Claims. (Cl. 252—171)

This invention relates to the stabilization of chlorinated hydrocarbons and in particular to the stabilization of trichlorethylene; and to processes for treating metal surfaces therewith.

Trichlorethylene is extensively used in industry as a solvent, especially for the degreasing of metals. It is also useful as the predominant ingredient in certain anhydrous phosphatizing, chromatizing, and/or painting compositions. These uses frequtnly involve exposure of the trichlorethylene over long periods of time to conditions which tend to promote its decomposition. Such conditions include elevated temperatures, the presence of oxygen, the presence of ultraviolet light, the presence of certain metal-containing compounds, the presence of free hydrogen chloride and complex combinations thereof.

In order to overcome this tendency toward decomposition, a wide variety of stablizers have been suggested. Included among these are amines and related nitrogen-containing compounds such as pyridine, triethyl amine, diisopropyl amine, hydrazones, and N-methyl pyrrole (U.S. Patent No. 2,492,048); phenols, such as p-tertiary amyl phenol (U.S. Patent 2,115,723), butylated hydroxy toluene, and thymol; epoxides and inner ethers such as glycidol, butylene oxide, epichlorhydrin, and tetrahydrofuran (U.S. Patents Nos. 2,371,645, 2,797,250, and U.S. 2,998,461); lactones (U.S. Patent No. 2,958,712); olefins; unsaturated nitriles; esters; aliphatic alcohols; acetylenic alcohols; and combinations of these and other compounds.

The functioning of a number of these prior art stabilizers, and notably the functioning of many of the antioxidants, appears to be impaired by the presence of free hydrogen chloride in the system. In fact, any free HCl which is present in the system seems to be a key intermediate in a vicious circle involving further decomposition of the trichlorethylene. Accordingly, many stabilizer systems include one or more compounds designed to react or combine with this free HCl, thereby destroying its harmful effect. Unfortunately, most of these compounds also react or combine with one or more other materials which are apt to be present, including water, alcohols, other acids, and certain amines; and in so doing, they are generally wasted.

It is an object of the present invention to provide improved trichlorethylene-based compositions. It is a further object to provide better stabilizer systems for trichlorethylene. A further object is to provide stabilized trichlorethylene which, when used under commercial conditions, will contain a minimum of free HCl. A still further object is to provid emore effective combinations of antioxidants and HCl absorbers, for use in trichlorethylene. Another object is to provide improved metal-treating processes, using stabilized trichlorethylene-based compositions. Other objects will appear hereinafter.

This invention is based upon the observation that certain cyclopropane derivatives function as superior stabilizers for trichlorethylene, both when used by themselves and when used in combinations with other stabilizers, notably when used in combination with antioxidants.

The cyclopropane derivatives which are useful may be described generally as those compounds which contain at least one cyclopropyl structure of the formula:

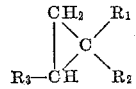

and which have a molecular weight in the range of 65 to 200. The $R_1$, $R_2$ and $R_3$ substituents attached to the cyclopropane ring may include hydrogen; chlorine; nitrile; alkyl and aryl groups having no more than 8 carbon atoms each; and ester-containing, ether-containing, ketone-containing, epoxide-containing, and cyclopropyl-containing groups having from 1 to 8 carbon atoms each. These groups may themselves be substituted by, or contain, other groupings which are not incompatible with the system such as chloro groups, nitro groups, amino groups, hydroxy groups, and olefinic linkages. Two of the bonds leading from the cyclopropyl structure may be attached to opposite ends of a single divalent radical, thereby forming a bicyclic compound, as in the case of norcarane (1,2-methylene cyclohexane):

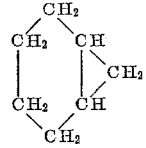

The preferred cyclopropane derivatives are those selected from the group consisting of 1,1-diethyl cyclopropane; 1,1-dichloro cyclopropane; dicyclopropyl ketone; methyl cyclopropyl ketone; methyl cyclopropyl carboxylate; cyclopropyl cyanide; and norcarane. Several of these cyclopropane derivatives may be used simultaneously, if desired.

These cyclopropane derivatives are believed to exert their stabilizing function by reacting with free HCl. This reaction presumably involves a rupturing of the cyclopropane ring, with the HCl adding across the ruptured bond.

The amount of cyclopropane derivative which is used is generally in the range of from about 0.01% to about 1.0% by weight, based upon the total weight of the trichlorethylene-containing composition. Larger or smaller concentrations, however, may occasionally be useful. Addition of excess cyclopropane derivative will not interfere with its stabilizing action and, because of the excellent ring stability, will not impair the performance of the solvent. Preferred concentrations are in the range of from 0.05% to 0.5% by weight.

The stabilizers of the present invention may be used with other known stabilizers for trichlorethylene, particularly with those mentioned hereinbefore. They may also be used with olefins such as diisobutylene and cyclohexene; with unsaturated nitriles such as acrylonitrile and methacrylonitrile; with hydrazones such as formaldehyde diethyl hydrazone and acetaldehyde dimethyl hydrazone; with esters such as ethyl acetate, methyl propionate, and butyl acetate; with aliphatic alcohols such as n-butanol, isobutanol, tertiary butanol, n-pentanol, and pentanol-2; with acetylenic alcohols, such as propargyl alcohol; and with other known stabilizers.

According to a preferred embodiment of the invention, the cyclopropane derivatives are used in synergistic combination with stabilizers of the antioxidant type such as p-tertiary amyl phenol, butylated hydroxy toluene, butylated hydroxy anisole, thymol, and N-methyl pyrrole. When used in conjunction with the cyclopropane derivatives, these antioxidants are generally present in amounts between about 0.001% and about 0.1% by weight, based upon the total weight of the trichlorethylene-containing composition, and preferably between about 0.003% and about 0.03% by weight. Particularly preferred are the synergistic combinations involving the use of one of the cyclopropane derivatives together with p-tertiary amyl phenol or N-methyl pyrrole.

These antioxidant-type compounds are believed to be especially sensitive to the presence of free HCl and therefore function very much more efficiently when one of the cyclopropane derivatives is present for selectively eliminating this HCl. The invention should not be construed as being limited, however, by any theory regarding the mechanism by which these various stabilizers are believed to function. For example, the cyclopropyl compounds themselves function to some extent as antioxidants, i.e., they inhibit the oxidation of trichlorethylene.

The stabilized trichlorethylene compositions of the present invention may be used in the degreasing of a wide variety of metals and metal objects, including ferrous metals, aluminum and aluminum alloys, and zinc galvanized articles. The compositions may be applied cold or hot, either by dipping or by spraying. Preferably, the compositions are used in the well-known vapor degreaser type of apparatus, in which the trichlorethylene is continuously being boiled up from a sump to produce a dense vapor zone, with cooling coils located near the top of the apparatus to define the top of the vapor zone. An article to be cleansed is passed into this vapor zone and the vapors continuously condense on the article, dissolving the grease and other soilants. The condensed solvent then drips off the article, carrying the grease, etc., down into the sump.

In a degreaser apparatus of this type, a given stabilizer ingredient may function predominantly in the liquid zone, or predominantly in the vapor zone, or both. The preferred stabilizers of the present invention are those which both boil and condense right along with the trichlorethylene. In this way, the stability of the trichlorethylene can be maintained in both the liquid phase and the vapor phase. This same effect, of course, can also be achieved by using several stabilizers, at least one of which functions primarily in the liquid phase, and at least one of which functions primarily in the vapor phase. The maintaining of effective stabilization in both phases is important not only from the viewpoint of preventing loss of trichlorethylene, but also from the viewpoint of preventing corrosion. The by-products resulting from the decomposition of the trichlorethylene are highly corrosive toward many of the ferrous metals which are preferred as the materials of construction for the different parts of a vapor degreaser. They are also corrosive toward many of the metals and metal objects which are apt to be passed through the degreaser as part of the work load.

The group of seven preferred cyclopropane derivatives enumerated hereinbefore have been selected in view of their ability to boil, and to condense, along with the trichlorethylene. In this regard, the boiling point of the derivative by itself is not necessarily the determining factor. The critical factor is the manner in which a relatively small amount of the stabilizer distributes itself in the presence of the relatively large amount of trichlorethylene. Although the boiling points of these particular seven cyclopropane derivatives vary quite considerably from one another, they have been found to have a common ability to stabilize trichlorethylene, under varying conditions, in both the liquid and vapor phases.

In recent years, trichlorethylene-containing compositions have come to be used extensively in industrial painting processes, in anhydrous phosphatizing processes, and in anhydrous chromatizing processes. In all of these compositions, the trichlorethylene is the predominant ingredient, in the sense that it accounts for at least 50% of the weight of the total composition, and usually at least 60% or 70% of the total. A typical paint composition may contain from 50% to 95% of trichlorethylene, together with one or more vehicles or resinous binders, one or more pigments or hiding agents in finely divided form, one or more extenders, one or more coalescing agents, etc. A typical phosphatizing composition may contain from 85% to 99% of trichlorethylene, together with a small amount of phosphoric acid and/or one or more other phosphate compounds, one or more ingredients to promote the solubility of the phosphoric ingredient in the trichlorethylene, etc. A typical chromatizing composition may contain from 85% to 99% of trichlorethylene, together with a small amount of chromic acid and/or one or more other chromate compounds, one or more ingredients for solubilizing the chromic ingredient, one or more promoters, etc. Frequently, these compositions are initially supplied as concentrates, with additional amounts of trichlorethylene and/or other ingredients being added as required at the point of use. For example, some of the necessary ingredients for phosphatizing processes or for chromatizing processes may be supplied in compositions which contain no more than 55% or 60% of trichlorethylene.

In such instances, it is highly desirable not only that the compositions be properly stabilized when actually being employed for their intended use, but also that the initial concentrates be properly stabilized in order to prevent decomposition which may occur, for example, merely in storage, especially in hot climates. Secondly, it is desirable that these concentrates contain stabilizers which either are the same as, or at least are compatible with, the stabilizers in the trichlorethylene that is to be used for thinning purposes. Thirdly, it is often desirable to operate a multi-step process involving two, three, or even four of the operations of degreasing, phosphatizing chromatizing and/or painting in an over-all sequence. In such instances, it is highly desirable that the trichlorethylene-containing compositions employed in the various operations all contain the same stabilizers, or at least contain stabilizers which are compatible with one another. This is particularly important where two or more of these operations are to be carried out under a single common, interconnecting trichlorethylene-containing vapor zone.

The cyclopropane derivatives of this invention are useful in all of the foregoing respects. In particular, they are compatible with, or unreactive with, the acidic phosphatizing chromatizing compositions, and they are compatible with the wide assortment of ingredients found in different paint compositions. They accordingly exhibit marked advantages over many of the prior art stabilizers, most of which are consumed or destroyed by interaction, for example, with strong acids such as phosphoric and chromic acid.

The stabilizers of the present invention are evaluated by means of a standard stability test. In this test, the trichlorethylene composition is placed in a flask and is refluxed for four hours under exposure to ultraviolet light, with oxygen gas being bubbled up continuously through the refluxing composition. The effluent gases are scrubbed with water to remove the volatile acids, primarily HCl. The condensed trichlorethylene is automatically returned to the flask, for further exposure to oxygen and UV light. After four hours, the aqueous layer is titrated for acid. The amount of acid generated, which is reported in terms of milliliters of 1-Normal acid, is a direct measure of the tendency of the trichlorethylene to degrade in the presence of oxygen and light.

EXAMPLES 1 THROUGH 3

In order to have a basis against which to compare the cyclopropyl stabilizers of the present invention, standard stability tests were run on straight unstabilized trichlorethylene and on trichlorethylene containing preferred concentrations of two of the best commercially used antioxidants. The results of these tests are reported in Table I.

*Table I*

| Example No. | Stabilizer | Concentration (percent by weight) | Acidity (ml. of 1-N acid) |
|---|---|---|---|
| 1 | None | | 4.0 |
| 2 | p-Tertiary amyl phenol | 0.01 | 1.3 |
| 3 | N-methyl pyrrole | 0.01 | 0.9 |

EXAMPLES 4 THROUGH 7

Using the standard stability test procedure, runs were made in which five individual cyclopropyl compounds were added in stabilizing quantities to otherwise unstabilized trichlorethylene. The results are reported in Table II.

*Table II*

| Example No. | Cyclopropyl Compound | Concentration (percent by weight) | Acidity (ml. of 1-N acid) |
|---|---|---|---|
| 4 | 1,1-diethyl cyclopropane | 0.2 | 0.5 |
| 5 | 1,1-dichloro cyclopropane | 0.1 | 0.6 |
| 6 | Cyclopropyl nitrile | 0.1 | 0.6 |
| 7 | Dicyclopropyl ketone | 0.1 | 0.9 |

It will be noted that each of these cyclopropyl compounds, when used alone, gave very effective stabilization which in general was markedly superior to that obtained when using either of the two widely used stabilizers shown in Examples 2 and 3.

EXAMPLES 8 THROUGH 10

Using the same test procedure, runs were made in which a pair of stabilizers was added to otherwise unstabilized trichlorethylene. Each of the samples contained 0.01% of p-tertiary amyl phenol (i.e., the same amount as was employed in Example 2). In addition, each sample contained a cyclopropyl compound. The results are reported in Table III.

*Table III*

[All samples contain 0.01% of p-tertiary amyl phenol]

| Example No. | Cyclopropyl Compound | Concentration (percent by weight) | Acidity (ml. of 1-N acid) |
|---|---|---|---|
| 8 | 1,1-diethyl cyclopropane | 0.2 | 0.4 |
| 9 | Methyl cyclopropyl carboxylate | 0.2 | 0.5 |
| 10 | Methyl cyclopropyl ketone | 0.2 | 0.4 |

It will be noted that in each instance the results are superior to those obtained when only one of the stabilizers is employed (see Table I and Table II).

EXAMPLES 11 THROUGH 13

Using the same test procedure, runs were made in which other pairs of stabilizers were added to otherwise unstabilized trichlorethylene. Each of the samples contained 0.01% of N-methyl pyrrole (i.e., the same about as was employed in Example 3). In addition, each sample contained a cyclopropyl compound. The results are reported in Table IV.

*Table IV*

[All samples contain 0.01% of N-methyl pyrole]

| Example No. | Cyclopropyl Compound | Concentration (percent by weight) | Acidity (ml. of 1-N acid) |
|---|---|---|---|
| 11 | Methyl cyclopropyl carboxylate | 0.2 | 0.24 |
| 12 | Methyl cyclopropyl ketone | 0.2 | 0.3 |
| 13 | Norcarane | 0.25 | 0.5 |

It will be noted that in each instance the results are excellent and are superior to those obtained when only one of the stabilizers is employed (see Table I and Table II).

EXAMPLE 14

A run was made in a small vapor degreaser unit measuring 15 inches by 15 inches by 40 inches in height. This unit was charged with about 8 gallons of trichlorethylene which was stabilized with a modified version of a commercially used stabilizer system. The modification consisted of removing the epoxide compounds, which are essential components in the commercial system, and replacing these compounds by 0.2% by weight of methyl cyclopropyl ketone. Over an elapsed time of 50 days, this unit was operated for three consecutive periods of 9 days, 4 days, and 28 days. It was idle for two intervening periods of 3 days and 6 days in between. With the exception of occasional additions of trichlorethylene containing 0.01% by weight of p-tertiary amyl phenol, no additional stabilizers were introduced into the unit throughout the 50-day period. At the end of the run, the trichlorethylene was extracted with water, to remove any hydrogen chloride (HCl) which might have been formed as a result of degradation of the trichlorethylene. The pH of the water extract was 6.9, thus indicating that the trichlorethylene had been very effectively stabilized throughout the duration of the run.

Since it will be apparent that many modifications and changes can be made without departing from the spirit of this invention, the invention should not be construed as limited, for instance, by the specific examples included herein.

I claim:

1. A liquid composition consisting essentially of trichlorethylene together with a stabilizing amount of from about 0.01% to about 1.0% by weight, based upon the total weight of the trichlorethylene-containing composition, of at least one cyclopropane derivative from the group consisting of 1,1-diethylcyclopropane;
1,1-dichloro cyclopropane;
dicyclopropyl ketone;
methyl cyclopropyl ketone;
methyl cyclopropyl carboxylate;
cyclopropyl nitrile; and
norcarane.

2. A liquid composition consisting essentially of trichlorethylene together with a stabilizing amount of from about 0.01% to about 1.0% by weight, based upon the total weight of the trichlorethylene-containing composition, of 1,1-diethyl cyclopropane.

3. A liquid composition consisting essentially of trichlorethylene together with a stabilizing amount of from about 0.01% to about 1.0% by weight, based upon the total weight of the trichlorethylene-containing composition, of 1,1-dichloro cyclopropane.

4. A liquid composition consisting essentially of trichlorethylene together with a stabilizing amount of from about 0.01% to about 1.0% by weight, based upon the total weight of the trichlorethylene-containing composition, of cyclopropyl nitrile.

5. A liquid composition consisting essentially of trichlorethylene together with a stabilizing amount of from about 0.01% to about 1.0% by weight, based upon the total weight of the trichlorethylene-containing composition, of norcarane.

6. A composition according to claim 1 containing from about 0.05% to about 0.5% by weight, based upon the total weight of the trichlorethylene-containing composition, of the cyclopropane derivative.

7. A composition according to claim 1 which contains a synergistic stabilizer combination of the cyclopropane derivative together with from about 0.001% to about 0.1% by weight, based upon the total weight of the trichlorethylene-containing composition, of a stabilizer from the group consisting of p-tertiary amyl phenol, butylated hydroxy toluene, butylated hydroxy anisole, thymol, pyridine, triethyl amine, diisopropyl amine, hydrazones, and N-methyl pyrrole.

8. A homogeneous liquid composition according to claim 7 wherein the stabilizer is p-tertiary amyl phenol.

9. A homogeneous liquid composition according to claim 7 wherein the stabilizer is N-methyl pyrrole.

10. A process which comprises contacting a metal with a treating composition consisting essentially of trichlorethylene together with a stabilizing amount of from about 0.01% to about 1.0% by weight, based upon the total weight of the trichlorethyle-containing composition, of at least one cyclopropane derivative from the group consisting of 1,1-diethyl cyclopropane; 1,1,-dichloro cyclopropane; dicyclopropyl ketone; methyl cyclopropyl ketone; methyl cyclopropyl carboxylate; cyclopropyl nitrile; and norcarane.

References Cited by the Examiner
UNITED STATES PATENTS

| | | | |
|---|---|---|---|
| 2,008,680 | 7/1935 | Carlisle et al. | 260—652.5 |
| 2,802,885 | 8/1957 | Cole et al. | 260—652.5 |
| 3,147,589 | 9/1964 | James | 60—35.4 |

FOREIGN PATENTS 765,522   1/1957   Great Britain.

OTHER REFERENCES

Lloyd: "Alicyclic Compounds," Edward Arnold Ltd., London, England (1963) (pages 50–52).

JULIUS GREENWALD, Primary Examiner.

J. T. FEDIGAN, Assistant Examiner.